US006526296B1

United States Patent
Nieminen

(10) Patent No.: US 6,526,296 B1
(45) Date of Patent: Feb. 25, 2003

(54) ELECTRONIC DEVICE AND A CONTROL MEANS

(75) Inventor: Timo T. Nieminen, Tampere (FI)

(73) Assignee: Nokia Mobile Phones Limited, Espoo (FI)

( * ) Notice: Subject to any disclaimer, the term of this patent is extended or adjusted under 35 U.S.C. 154(b) by 0 days.

(21) Appl. No.: 09/322,789

(22) Filed: May 28, 1999

(30) Foreign Application Priority Data

Jun. 2, 1998 (FI) .................................................. 981243

(51) Int. Cl.[7] .............................................. H04B 1/38
(52) U.S. Cl. ........................ 455/575; 455/90; 455/550; 455/566; 379/428; 379/433
(58) Field of Search ........................... 455/89, 90, 575, 455/550, 33.1, 403, 556, 557, 553, 566, 572, 128, 552; 379/433, 434, 428, 438, 440, 447

(56) References Cited

U.S. PATENT DOCUMENTS

| | | | | |
|---|---|---|---|---|
| 5,189,632 A | * | 2/1993 | Paajanen et al. ............ 708/109 |
| 5,262,763 A | | 11/1993 | Okuyama et al. ............. 345/87 |
| 5,266,949 A | | 11/1993 | Rossi ........................... 341/22 |
| 5,408,060 A | | 4/1995 | Muurinen .................... 200/314 |
| 5,436,954 A | | 7/1995 | Nishiyama et al. ........... 379/58 |
| 5,584,054 A | * | 12/1996 | Tyneski et al. ............. 455/566 |
| 5,646,649 A | * | 7/1997 | Iwata et al. .................. 345/173 |
| 5,715,524 A | * | 2/1998 | Jambhekar et al. ........... 455/90 |
| 5,797,089 A | * | 8/1998 | Nguyen ....................... 455/403 |
| 5,805,084 A | | 9/1998 | Mannisto ..................... 341/22 |
| 5,877,709 A | | 3/1999 | Ala-Lehtimaki et al. ...... 341/26 |
| 5,884,185 A | * | 3/1999 | Kim ............................. 455/550 |
| 5,905,235 A | | 5/1999 | Charman .................... 200/5 A |
| 5,915,228 A | * | 6/1999 | Kunihiro et al. ............. 455/575 |
| 5,956,656 A | * | 9/1999 | Yamazaki .................... 455/575 |
| 6,046,730 A | * | 4/2000 | Bowen et al. |
| 6,047,196 A | * | 4/2000 | Makela et al. ............... 455/556 |
| 6,085,112 A | * | 7/2000 | Kleinschmidt et al. ...... 455/556 |
| 6,128,475 A | * | 10/2000 | Wicks et al. .................. 455/90 |
| 6,173,194 B1 | * | 1/2001 | Vanttila ....................... 455/566 |
| 6,208,876 B1 | * | 3/2001 | Raussi et al. ............... 455/557 |
| 6,208,879 B1 | * | 3/2001 | Iwata et al. .................. 455/566 |
| 6,215,474 B1 | * | 4/2001 | Shah ........................... 345/168 |
| 6,230,028 B1 | * | 5/2001 | Shirakawa .................. 455/566 |
| 6,278,888 B1 | * | 8/2001 | Hayes, Jr. et al. ........... 455/566 |

FOREIGN PATENT DOCUMENTS

| | | | | |
|---|---|---|---|---|
| EP | 0534478 A2 | * | 9/1992 | ............ H04M/1/72 |
| EP | 0 715 441 A1 | | 6/1996 | |
| EP | 0 755 142 A2 | | 1/1997 | |
| EP | 0802659 A1 | * | 4/1997 | ............ H04M/1/02 |
| EP | 0 776 140 | | 5/1997 | |
| FI | 85776 | | 2/1992 | |
| GB | 2 310 562 A | | 8/1997 | |
| WO | WO 97/09813 | | 3/1997 | |
| WO | 9741677 | * | 11/1997 | ............ H04M/1/02 |
| WO | WO 98/19226 | | 5/1998 | |

* cited by examiner

*Primary Examiner*—Thanh Cong Le
*Assistant Examiner*—Pablo N Tran
(74) *Attorney, Agent, or Firm*—Perman & Green, LLP

(57) ABSTRACT

The invention relates to an electronic device, which device (1) comprises a first housing part (2, 3) provided with a first inner surface (2a, 3a) and a first outer surface (2b, 3b), a second housing part (2, 3) provided with a second inner surface (2a, 3a) and a second outer surface (2b, 3b), hinge means (4) for moving the housing parts (2, 3) to a closed position (S) and to an opened position (A), a first user interface (5a, 5b), which is at least partly located on the inner surface (2a, 3a) of one or more housing parts (2, 3), and a second user interface (6a, 6b), which is at least partly located on the outer surface (2b, 3b) of one or more housing parts (2, 3). The device (1) comprises at least one control means (7a, 7b, 7c) to be used in connection with the second user interface (6a, 6b), and arranged to be used also in connection with the first user interface (5a, 5b), and a control function of said control means (7a, 7b, 7c) is arranged to be determined on the basis of the user interface (5a, 5b, 6a, 6b) set active at a time.

28 Claims, 3 Drawing Sheets

ELECTRONIC DEVICE AND A CONTROL MEANS

Figure 1:
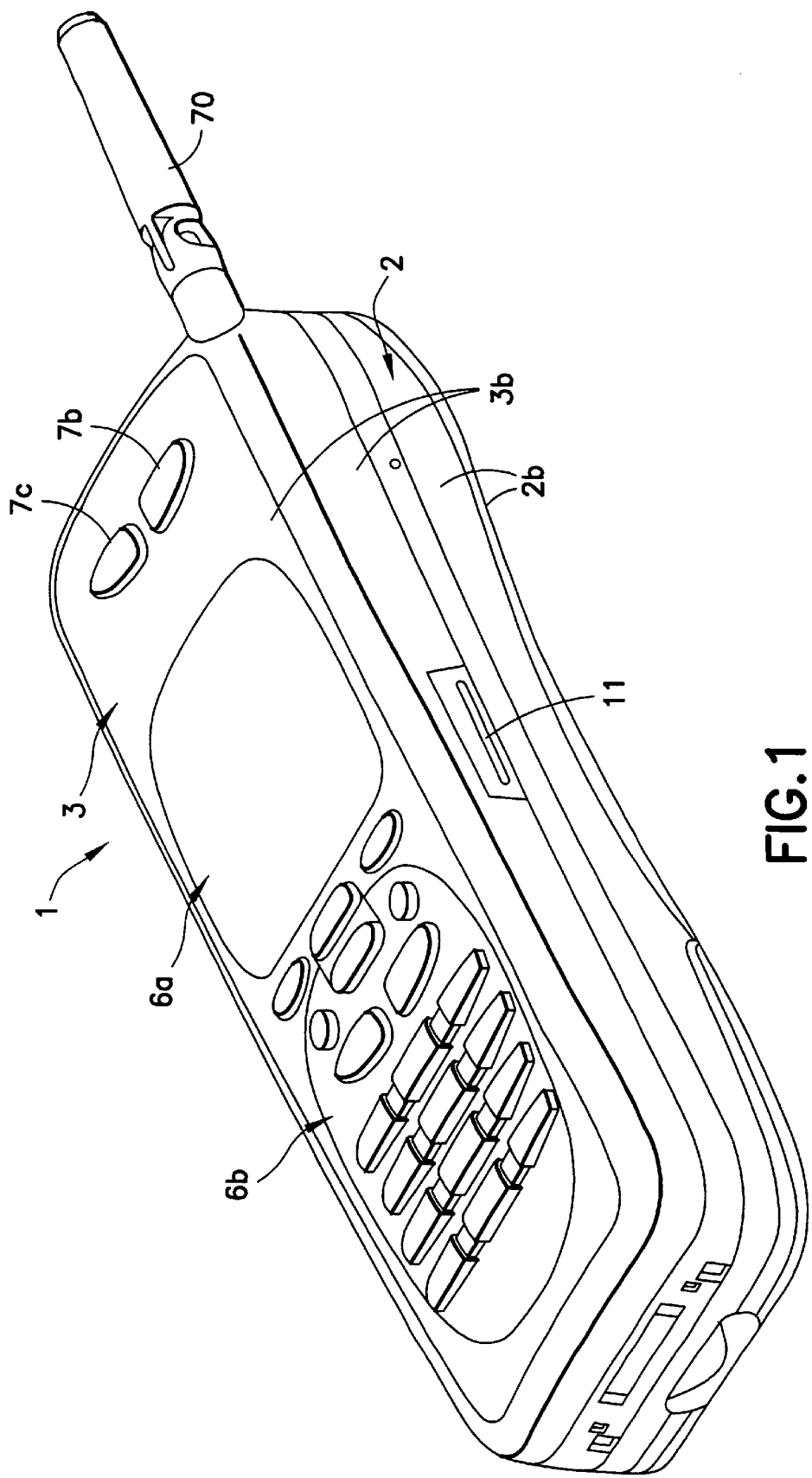

This invention relates to an electronic device according to the preamble of the appended claim 1. The invention also relates to a control means according to the preamble of the appended claim 6.

As is well known, there are devices such as notebook computers, small hand-held computers, or PDA devices (Personal Digital Assistant) for storing various information. In this specification, PDA devices refer to devices similar to the ones described above. In these devices, it is possible to store for example calendar information, notes, address information, telephone numbers, or corresponding data given by the user. This data can be reviewed by means of the display of the device. The data is typically entered in these devices by means of a keypad, but it is known that there are also devices available which are equipped with a touch screen so that the functions of the devices can be controlled by touch. The performance of PDA devices is constantly enhanced, and they already contain several features known from PC devices (Personal Computer).

To allow better mobility for people, there are wireless communication devices available according to prior art. In the field of mobile stations, increasing popularity has been gained by a portable mobile phone, which can be for example a digital mobile phone according to the GSM standard (Global System for Mobile Communications), operating in a mobile communication system based on a cellular network.

For some PDA devices, there are also expansion cards available according to a PCMCIA standard (Personal Computer Memory Card International Association), for connecting these devices for example to mobile phones, which thereby function as modems for the PDA devices. Thus, with the help of PDA devices and by utilizing radio waves, it is possible to transmit and receive for example telecopier messages, SMS messages (Short Message Service) and other text files in a wireless manner.

In connection with PC (Personal Computer) devices, portable computers, and wireless communication devices, different control means have become known for controlling the functions of these devices. Such control means include, for example, one or more keys located by the display, wherein a keystroke selects the desired control function indicated by providing the command of the function in writing, or a symbol illustrating the same, in the display in the vicinity of the key. In different situations, the control function selectable at a time is illustrated in such a way that the command representing the function is output to the display by the control program of the device, wherein the same key can be used to select different functions. The keyboards of PC devices typically also contain keys for moving the cursor up, down, to the left, or to the right on the display. One known control device is a mouse which can be connected to a PC device, and which comprises a control means, such as a track ball, for moving the cursor on the display of the PC device, and one or more control means, typically control buttons, for the purpose of e.g. selecting functions from the menu on the display, or for activating the menu itself. In connection with portable computers, a track ball and control buttons placed in connection with the keyboard and corresponding to the functions of a mouse have also become known, as well as a touch screen for controlling the cursor.

In connection with mobile phones, a known control means, disclosed in publication EP 0 755 142 A2, is a rotary discoidal control roll, placed on the side of a mobile phone, by means of which it is possible to move in a telephone directory displayed on the display of the mobile phone, and which control roll is pressed to select a desired telephone number. With the help of the control roll, it is also possible to move in menus and to select a desired alternative by pressing the control roll. According to the publication EP 0 715 441 A1, in a foldable mobile phone, a cylindrical control roll, rotatable around its longitudinal axis, can also be placed in connection with a hinge, substantially parallel to and on the same axis with the hinge. Thus, it is also possible to place a control button in the vicinity of the control roll, for example for the purpose of selecting and activating a function retrieved from the menu by means of the control roll. From publication U.S. Pat. No. 5,436,954 it is also known that a control roll placed on a hinge can be moved at least a short distance in the direction of its longitudinal axis, wherein the control roll also functions as a control button.

Furthermore, in connection with portable laptop PC devices, a control device is known which functions in a similar way as the aforementioned mouse, wherein one control means, i.e. a control lever, a control stick, or the like, corresponding to the track ball of the mouse, is placed next to the display located on one side of the housing part of the device, and the side opposite to the housing part is provided with control means, i.e. buttons, corresponding to the two control buttons of the mouse. The above-described control device is used for example in such a way that the control lever is controlled with the thumb, the first control button with the forefinger, and the second control button with the middle finger.

The features of wireless communication devices, such as mobile phones, increase constantly, and typically include functions for storing e.g. telephone numbers of persons and firms. In a known manner, there are also devices available, which contain two different user interfaces combined, for example the user interfaces of a wireless communication device and a PDA device. One such device of prior art is Nokia Communicator 9000, i.e. a communicator which has a first user interface, i.e. the PDA interface, whereby it is possible to store various data in the device, to have a wireless connection to the Internet network, and to receive for example telecopier messages, and which has a second user interface, i.e. the CMT user interface (Cellular Mobile Telephone), whereby it is possible to perform conventional mobile phone functions, such as receiving a call and selecting a phone number. The communicator described above comprises separate keypads and displays for the two user interfaces; the PDA user interface is arranged to be used in the opened position of the device, and the CMT user interface is arranged to be used in the closed position of the device.

Patent publication U.S. Pat. No. 5,262,763 discloses an electronic device, which also has various positions for different user interfaces. These user interfaces become available by opening the different housing parts of the device, wherein the device recognizes which housing part is open at a time. Each user interface has a separate keypad and display. The user interface is recognized by using a photo cell, which recognizes which housing part is open in the device. Known from portable laptop computers is also a switch, placed in a hinge of the device, which recognizes whether the device is in an opened or closed position. However, the electronic device disclosed in the publication U.S. Pat. No. 5,262,763 differs from the communicator in the respect that the device can be used by means of different user interfaces substantially from the same direction.

In devices of prior art, which comprise various user interfaces, as in the above described communicator, for each user interface, control means separate from other user interfaces are used, such as select buttons or keys for controlling the cursor. However, these control means increase the need for space, especially in cases when smaller and lighter versions of the devices are manufactured. A further problem is that the control means of each user interface often have to be placed in locations which are inconvenient with respect to the usability of the user interface in question, because the control means must not disturb the use of another user interface or cause interference in the use of the control means.

The purpose of this invention is to achieve an improvement in the state of art, and to enhance the usability of electronic devices considerably. An electronic device according to the invention is characterized in what will be presented in the characterizing part of the appended claim 1. A control means according to the invention is characterized in what will be presented in the characterizing part of the appended claim 6.

An advantage of the invention is that the same control means can be used in connection with two or more different user interfaces. Thus, the need for several separate control means decreases, and at the same time for example the space used by the control means is diminished compared with prior art. Another advantage of the invention is that the manufacturing costs of the device are reduced, since the number of control means can be decreased compared with prior art.

One special advantage of the invention is that the control means for the first user interface of the device can also be placed in a location, where it conventionally would disturb the use of another user interface. This appears from a device according to a preferred embodiment of the invention, in which control means, i.e. push-buttons, placed in the housing part in the opened position of the device and intended for operating the first user interface, are located in connection with the keypad and display of the second user interface.

According to a preferred embodiment of the invention, the control function of the control means is arranged to be set automatically for the user interface used at a time, on the basis of the position of the housing part of the device, wherein the user is not responsible for selecting the function of the control means, whereby malfunctions decrease.

Figure 2:
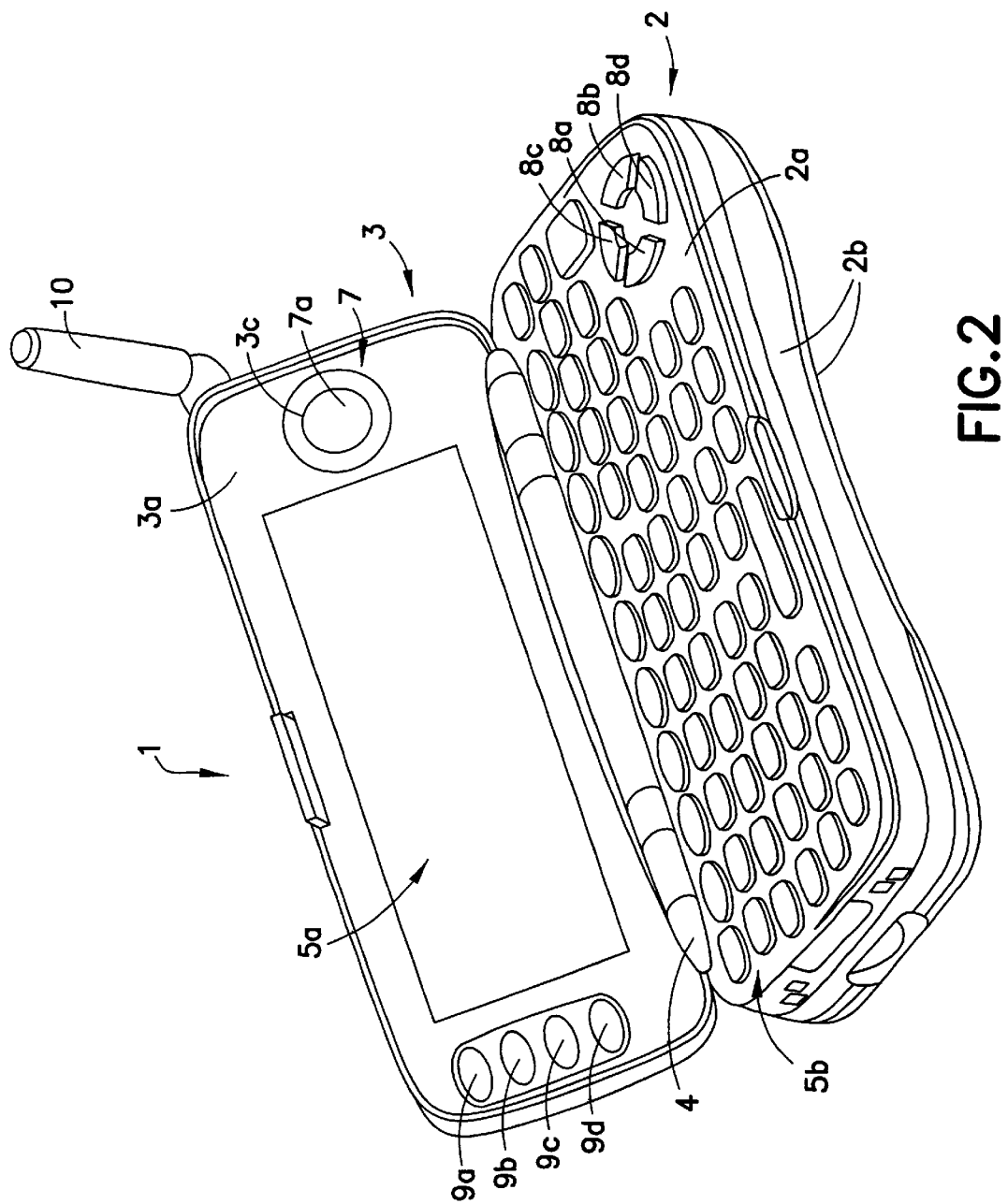
Figure 3:
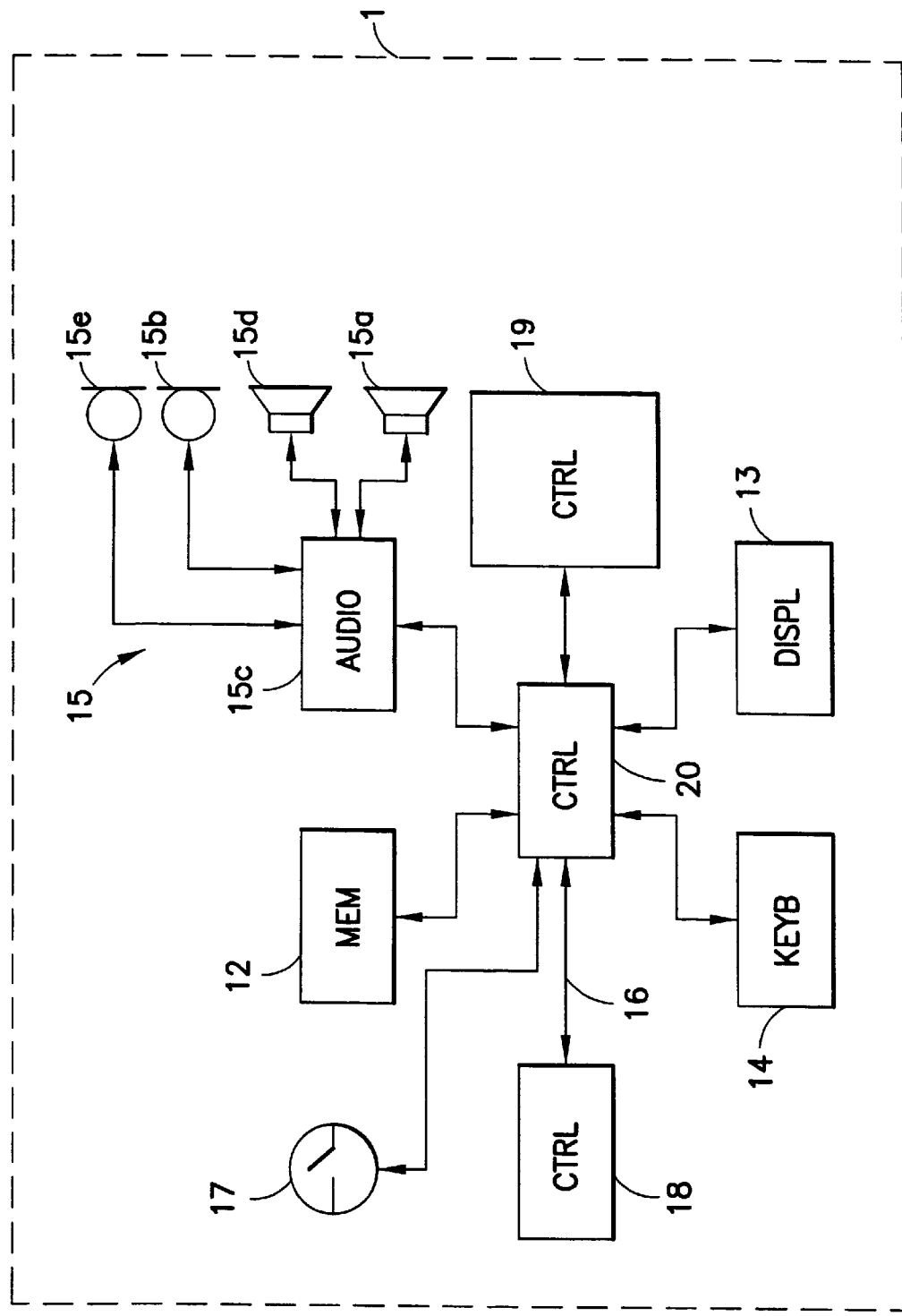

In the following, the invention will be described in more detail, using an electronic device according to a preferred embodiment of the invention as an example, but it is obvious that the invention can also be applied in other electronic devices within the scope of the claims. In the description, reference is made to the appended figures, in which:

FIG. 1 shows, in a perspective view, an electronic device according to a preferred embodiment of the invention in closed position, FIG. 2 shows, in a perspective view, an electronic device according to a preferred embodiment of the invention in opened position, and FIG. 3 shows, in a skeleton diagram, different functional blocks in a wireless communication device according to a preferred embodiment of the invention.

In this description, a user interface (UI) typically refers for example to input and display means 5a–5b or 6a–6b, which are used to operate the device 1 in different positions A and S to input and to display information. Thus, the device 1 comprises a first user interface 5a–5b and a second user interface 6a–6b. The user interfaces are not, however, solely restricted to the above presented kind of input and display means 5a–5b and 6a–6b, but the user interface can comprise for example several display elements 5a, or merely a touch screen.

With reference to FIGS. 1 and 2, an electronic device 1 according to the invention, i.e. the device 1, comprises a first housing part 2, provided with at least an inner surface 2a and an outer surface 2b, and a second housing part 3, provided with at least an inner surface 3a and an outer surface 3b. The outer surface 2b or 3b also consists of the surfaces on the sides of the housing parts 2 or 3. The device 1 also comprises hinge means 4 to move the first housing part 2 and the second housing part 3 to a closed position S according to FIG. 1, in which position the inner surface 2a of the first housing part 2 and the inner surface 3a of the second housing part 3 face each other, and to an opened position A according to FIG. 2, in which position the inner surface 2a of the first housing part 2 and the inner surface 3a of the second housing part are exposed. The device 1 also comprises first input and display means 5a–5b for the first user interface, which means 5a–5b are placed on the inner surface 2a of the first housing part 2, and on the inner surface 3a of the second housing part 3, and second input and display means 6a–6b for the second user interface, separate from the first input and display means 5a–5b, the means 6a–6b being placed on the outer surface 3b of the second housing part 3.

The electronic device 1 according to the invention comprises at least one control means 7b or 7c, common to at least two user interfaces, to be used in connection with the interface which is selected active at a time, and the control function of said control means 7b or 7c is arranged to be determined on the basis of the user interface selected active at a time. Consequently, the device 1 comprises at least one control means 7b or 7c, for at least one control function to be used in connection with the second user interface 6a–6b, which control means is arranged to be used also in connection with the first user interface 5a–5b. By selecting one of the two user interfaces, it is thus possible to select the desired control function for example from two different control functions arranged for the control means of the control means 7b, 7c. In connection with a user interface, the use of a control means indicates, for example, that the control means is used to control the device 1, to control the cursor in the display section of the user interface, to enter information in the device 1, or to perform a selection from a menu, wherein the control means supplements the keypad section or the display section of the user interface. In this description, the user interface refers typically for example to input and display means 5a–5b or 6a–6b, which can be used to operate the device 1 in different positions A and S to input and to display information. The input and display means 5a–5b and 6a–6b typically comprise a keypad section 5b, 6b for entering the information, and a display section 5a, 6a for displaying information. The display section can also be replaced, either entirely or partly, with a touch screen.

In a device which comprises several user interfaces, it is most advantageous with respect to the use of the device, to activate the different user interfaces alternately, wherein the operation of the other user interface can be completely prevented, or the accidental activation of the functions of the device by the control means of the other user interface can be prevented. The user can select an active user interface, i.e. the one intended for primary use, for example by controlling with a button, but, according to the invention, also in this case the control function of the control means is determined on the basis of the user interface selected active at a time.

Thus, the control means can be used for example in an electronic device, such as a mobile phone, comprising only one housing part, whose each surface has its own user interface, for example for different functions. In addition, it is possible to equip the electronic device with one or more protective covers, for the purpose of covering the user interface at least partly and thus protecting it from unintentional use.

Preferably, the active user interface is determined on the basis of the position of the electronic device, which has the advantage that the user does not need to switch on the user interface. Furthermore, the advantage in that case is that it is easy for the user to recognize the active user interface in use by the position of the device, wherein confusions in the use of control functions of the control means are avoided. This kind of an electronic device will be described in the following.

Further referring to FIGS. 1 and 2, the device 1 according to a preferred embodiment of the invention is a wireless communication device 1, wherein the first user interface of the wireless communication device 1 is a PDA user interface, and the second user interface is a CMT user interface. The first input and display means 5a–5b of the wireless communication device 1 for the first user interface comprise a keypad section 5b placed on the inner surface 2a of the first housing part 2, and a display section 5a placed on the inner surface 3a of the second housing part 3. Moreover, the input and display means 6a–6b of the wireless communication device 1 for the second user interface comprise a keypad section 6b and display section 6a located on the outer surface 3b of the second housing part 3. In the wireless communication device 1 shown in FIG. 2, the keypad section 5b also comprises keys 8a–8d for moving the cursor on the display of the display section 5a to the left, to the right, up and down, and the display section 5a also comprises keys 9a–9d located by the display section 5a, for selecting control functions from the menu presented on the display of the display section 5a. The wireless communication device 1 also comprises an antenna 10.

Further referring to FIGS. 1 and 2, the device 1 according to a preferred embodiment of the invention also comprises switching means known as such (not shown in the figure) for perceiving at least a closed position S and an opened position A. Thus, for example the first control function of the control means 7b is arranged to be activated in the opened position A of the device 1, and the second control function of the control means 7b is arranged to be activated in the closed position S of the device 1. Thus, also the user interfaces of the electronic device 1 are arranged to be activated on the basis of a signal provided by the switching means for the control program of the device 1, in such a way that for example the first user interface is activated in the opened position A of the device 1 according to FIG. 2, and that the second user interface is activated in the closed position S of the device 1 according to FIG. 1. On the basis of this specification, it is possible for anyone skilled in the art to make the modifications required in the invention for the device 1 in manners known as such, for example advantageously by means of modifications made only in the control program of the control unit of the device 1, known as such. According to a simple example, the control unit is coupled to means, also known as such, for controlling the control means, and when the control unit receives a signal that a control means, for example a control button has been pressed, it also determines the position of the device 1. On the basis of the position, the control unit also selects the control function of the control means, for example a first or a second control function, and gives a signal to means, known as such, for controlling the display sections in order to activate procedures according to the control function. On the basis of the position, the control unit also selects either the display section 5a or 6a. Thereby the control function of the control means is defined on the basis of the position of the device 1 and at the same time on the basis of the activated user interface. It is, of course, obvious that the control unit can affect the function of some other part of the device 1 in a corresponding way.

Furthermore, the above described function will be discussed in more detail in the following. FIG. 3 presents an electronic device 1, i.e. a wireless communication device 1 according to a preferred embodiment of the invention in a reduced block diagram. The wireless communication device 1 comprises for instance a control unit 20, memory means 12, display means 13, and input means 14. The display means 13 correspond to the above described display sections 5a and 6a. The input means 14 correspond to the above described keypad sections 5b and 6b. In addition, the block diagram shows audio means 15, such as a receiver 15a and a microphone 15b, and an audio block 15c e.g. for converting a microphone signal from analog to digital form, and for converting a signal to be transmitted to the receiver 15a from digital to analog form. The audio means 15 can comprise an auxiliary receiver 15d and an auxiliary microphone 15e, for example for different housing parts 2, 3, of the device 1. The memory means 7 comprise, for instance, a random access memory (RAM), especially for data storing required during the use of the device 1, and a read only memory (ROM) especially for storing programs.

The control unit 20 comprises, for example, a micro controller unit (MCU) and a programmable logic circuit (ASIC, Application Specific Integrated Circuit), and it is also coupled to control blocks 19 or the like, controlling other functions of the wireless communication device 1, such as reception and transmission functions, I/O functions (Input/Output), and the radio parts of the device 1. The control unit 20 is also connected to the control means 7, especially to the sensor elements 18 of the same, from which the control unit 20 receives a control signal 16. The sensor elements 18 comprise, for example, a roll which is pressed against the control part 7a and is rotated under control by the control part 7a, by means of friction. The control signal 16 advantageously contains information on the movement of the control part 7a of the control means 7 around the rotation axes X, Y and Z. Furthermore, the control signal 16 can contain information on the state of the control button attached to the control part 7a. When the control unit 20 receives the control signal 16, it also defines the position of the housing parts 2 and 3 of the device 1. For this purpose, there are switching means 17, known as such, arranged in connection with the hinge means 4, and they indicate whether the housing parts 2 and 3 are in the opened or closed position. On the basis of the position, the control unit 20 can also select the control function of the control means 7 and give a signal to the display means 13, known as such, to control them in order to activate procedures according to the control function. On the basis of the position, the control unit 20 can select for example either the display part 5a or 6a for displaying information. In this way, the control function of the control means 7 can be determined on the basis of the position of the device 1, and at the same time, on the basis of the position, the desired user interface can be arranged active. If several user interfaces are switched off, also the control means 7 can thus be switched off. It is, of course, obvious that the control unit 20 can affect the function of another block of the device 1, for example the audio block 15c, in a corresponding manner.

In the opened position A of the device 1, the angle between the first housing part 2 and the second housing part 3 can vary a great deal, but for example in the opened position of the above presented communicator, in which the invention is applied, this angle is typically approximately from 100 to 140 degrees, wherein it is possible to control and operate the functions of the device 1, placed on top of a plane surface, for example by means of the keyboard section 5b of the first housing part 2 and the display section 5a of the second housing part 3. Naturally, the angle of the device 1, placed on a plane surface, can be even 180 degrees. In the closed position S of the device 1, the device 1 is arranged to lock for example by means of a locking mechanism 11, wherein the aforementioned angle can be very small, even nearly 0 degrees. The angle, in which the switching means arranged in the hinge 4 give a signal that the device 1 is in the closed position S, can naturally vary in width.

In the case of a device similar to the aforementioned communicator, this angle is for example such that in this angle, the operation of the first user interface is not possible, because the user can neither use the keypad 5b nor see the display 5a. Usually, this angle is very small, but it can be selected suitable for usability. Alternatively, with the help of a switching means arranged in connection with the locking mechanism 11, the device 1 is regarded as closed only after the locking mechanism 11 is in its locked position, wherein the second housing part 3 and the first housing part 2 are against each other. It is, of course, possible to arrange the control function of the control means 7b or 7c also in such a way that between the opened position A and the closed position S of the device 1 there is a so-called intermediate position, wherein the control means 7b has a different control function than for example in the closed position S, or wherein the control means 7b is switched off entirely in this intermediate position. Thus, by means of the switching means, several different positions have to be recognized. The function of the switching means is prior art as such, and therefore it is not necessary to discuss that in detail.

According to a preferred embodiment of the invention, at least one user interface of the electronic device 1 is a CMT user interface. Thereby, the other user interface is for example a PDA interface, as in the wireless communication device 1 according to the invention. For example in the above described communicator, i.e. wireless communication device, to which the invention is applied, the first user interface, i.e. the PDA user interface, is activated in the opened position A of the device 1, and the second user interface, i.e. the CMT user interface is activated in the closed position S of the device 1. The position of the device 1 is recognized with the help of switching means, and the active user interface is selected in a way known as such on the basis of the position. Thus, it is possible to use only the control means of the user interface active at that moment to activate functions, whereas in order to change the user interface, the second housing part 3 and the first housing part 2 of the device have to be moved either to the closed position S or to the opened position A. Furthermore, the wireless communication device 1 is provided with a control device 7, which will be described later, and whose function corresponds to the function of a mouse described above. It should be mentioned that for example the functions to be used in connection with the different user interfaces of the communicator are known as such, wherein it is not necessary to describe them in detail. Moreover, it is obvious that the electronic device can also comprise three or more user interfaces, which each have a keypad section and a display section of their own. Furthermore, it is obvious that the control means can be located in the device 1 also on the side of the outer surface 2b or 3b which is substantially transversal with respect to the inner surface 2a or 3a.

In the electronic device 1 according to the first preferred embodiment of the invention, at least one control means 7b or 7c, located on the outer surface 3b of the second housing part 3, is formed as a control button, a track ball, a control roll, a control cylinder, or the like. In FIG. 1, the device 1 according to the invention comprises two control buttons 7b and 7c. Thus, it is possible to press the control button 7b and 7c for example with a finger, but according to the present invention, the control function of each control button 7b and 7c corresponds to the user interface of the device 1 active at a time, for example either the PDA user interface or the CMT user interface.

In the opened position A of the device 1 according to FIG. 1, when the device 1 is functioning, the control button 7b or the control button 7c, or both of them, operate as buttons e.g. for selecting the functions of the PDA user interface in a menu presented on the display of the display section 5a. In the closed position S of the device 1, the control button 7b or the control button 7c, or possibly both of them, function as buttons of the CMT user interface for selecting a telephone number from a list displayed in the display 6a, or for scanning the aforementioned list of telephone numbers on the display. It is, of course, possible that in a user interface of the device 1, the control buttons 7b and 7c are also assigned another task, i.e. control function, for example the functions of SEND and END buttons in another user interface, which will be described later.

In an electronic device 1 according to a second preferred embodiment of the invention, at least one control means 7b or 7c, located on the outer surface 3b of the second housing part 3, is formed as a part of the control device 7. Thus, according to FIGS. 1 and 2, the control device 7 preferably comprises two control buttons 7b and 7c located on the outer surface 3b of the second housing part 3, and a control stick 7a or the like, located on the inner surface 3a of the second housing part 3. Thus, this control lever, control stick or the like, located by the display section 5a on the inner surface 3a of the second housing part 3, corresponds functionally to the track ball of a mouse, or a joystick type control means in particular, and the two control buttons 7b and 7c functionally correspond to the two control buttons of the mouse.

This control device 7 is used in connection with the first user interface of the device according to the invention, for example in connection with the PDA user interface, so that the control lever 7a is moved with the thumb, the control button 7b corresponding to the first control button of the mouse is moved with the forefinger, and the control button 7c corresponding to the second control button of the mouse is moved with the middle finger. For example the movement of the cursor on the display 5a of the user interface in question is controlled by means of the movement of the control lever 7a. In the presented preferred embodiment of the invention, the use of the control lever 7a is possible only when the device 1 is in the opened position. It is, of course, possible that the control lever 7a, or the control buttons 7b and 7c are also assigned another task, i.e. control function, for example to open menus on the display of the display section 5a, to select functions from the menu, or to scan an image or lists on the display.

In the closed position S of the device 1, the control buttons 7b and 7c function in connection with the second user interface of the above-described device 1 according to the invention, such as the CMT user interface. Thus, the control lever 7a cannot be used, because it is now located between the second housing part 3 and the first housing part 2. When operating the device 1 by means of the CMT user interface, the control function of the control button 7b corresponds, for example, to the key of a mobile phone which is pressed when answering an incoming call or when calling to a number selected by means of the keypad (so-called SEND key). Correspondingly, the control function of the control button 7c corresponds to the key of a mobile phone which is pressed when terminating a call (so-called END key). The control buttons 7b and 7c are in sight both in the opened position A and in the closed position S of the device 1, wherein it is possible to press them, for example with a finger, but according to the invention, their control functions correspond to the user interface of the device 1 active at a time, in other words, for example either to the PDA user interface or the CMT user interface. Naturally, it is possible that the control buttons 7b and 7c are also assigned another function, such as selecting the functions of a mobile phone from a menu and selecting a telephone number from a list displayed on the display 6a. Furthermore, it is, of course, obvious that the placement of the control lever 7a and the control buttons 7b, 7c can vary, but advantageously they are placed in a location in which it is easy for the user of the device 1 to use them, as in the device 1 according to FIGS. 1 and 2, on the right-hand side of the inner surface 3a of the second housing part 3.

According to a third preferred embodiment of the invention, an electronic device 1 comprises a control means located in the second housing part 3 and extending through the second housing part 3 to the inner surface 3a and to the outer surface 3b, and designed as a control lever, track ball, control roll, or the like. This embodiment differs from the embodiment presented in FIGS. 1 and 2 in that here the control lever 7a is replaced with a control lever, track ball, control roll or the like, extending through the second housing part 3. A particular advantage in this embodiment is that the control means, for example a track ball, can thus be used both in the opened position A and in the closed position S of the device 1. Consequently, for example the function of the track ball 7a can be selected on the basis of the active user interface of the device 1.

The function of the aforementioned track ball 7a corresponds to the function of the track ball used in connection with the above-described mouse, wherein its direction of rotation is not limited. The control roll 7a, which extends through the second housing part 3 and which can be discoidal or elongated, is arranged to rotate around rotation axis which is for example substantially parallel to the inner surface 3a of the second housing part 3 of the device 1. The function of the control lever 7a can be arranged for example in such a way that it is in its middle part attached with a hinge to the second housing part 3, wherein the first end of the control lever 7a extends to the inner surface 3a and the second end to the outer surface 3b.

In the specification above, the invention has been discussed when applied in connection with a preferred electronic device, but on the basis of the specification, it is obvious for anyone skilled in the art that the invention can also be applied in connection with other electronic devices within the scope of the claims. For example, it is obvious that in the device presented above, it is also possible to place the control means on the outer surface of the first housing part. Also in that case, the control means can be used in connection with both user interfaces, even though it is on the opposite side of the housing part or the device with respect to the user interfaces.

What is claimed is:

1. An electronic device comprising:
   a first housing part provided with a first inner surface and a first outer surface,
   a second housing part provided with a second inner surface and a second outer surface,
   hinge means for moving the housing parts to a closed position and to an opened position,
   a first user interface for activating functions, the first user interface at least partly located on the inner surface of one or more housing parts, and
   a second user interface for activating functions, the second user interface at least partly located on the outer surface of one or more housing parts,
   wherein:
      the device comprises at least one control means to be used in connection with the second user interface, and arranged to be used also in connection with the first user interface, and
      wherein a control function of said control means is arranged to be determined on the basis of the user interface set active at a time.

2. The electronic device according to claim 1, wherein:
   the first user interface and a first control function of the control means is arranged to be activated in the opened position of the device, and
   wherein the second user interface and a second control function of the control means are arranged to be activated in the closed position of the device.

3. The electronic device according to claim 1, wherein at least one of the control means located on the outer surface of a housing part is at least partly designed button-like, spherical, cylindrical, discoidal, or stick-like.

4. An electronic device according to claim 3 wherein the control means comprises means for generating a control signal and transmitting the control signal to the electronic device, to control the device by means of the control means.

5. The electronic device according to claim 1, wherein the control means comprises means for generating a control signal and transmitting the same to the electronic device, to control said device by means of the control means.

6. The electronic device according to claim 1 wherein the electronic device is a wireless communication device.

7. The electronic device according to claim 1, wherein said control means belongs to a control device which comprises a rotatable control means and at least one pressable control means to be used in connection with said rotatable control means.

8. An electronic device according to claim 1 wherein the at least one control means is located on the outer surface.

9. The electronic device according to claim 1, wherein the first user interface comprises a first display section and the second user interface comprises a second display section, the second display section being separate from the first display section.

10. The electronic device according to claim 9, wherein the first display section is located on the inner surface of a housing part and the second display section is located on the outer surface of a housing part.

11. The electronic device according to claim 9, wherein the first user interface comprises a first keypad section and the second user interface comprises a second, separate keypad section.

12. The electronic device according to claim 1, wherein the first user interface is a personal digital assistant user interface and the second user interface is a mobile telephone interface.

13. The electronic device of claim 1 wherein the first user interface is located on a surface of the housing part different from a surface of the housing part on which the second user interface is located.

14. The electronic device of claim 1 wherein the first user interface is active in a first position of the phone and wherein the second user interface is active in a second position of the phone, during which the first user interface is not active.

15. The electronic device of claim 1 wherein the first user interface is adapted to be used separately from the second user interface.

16. A control means for an electronic device, the electronic device comprising:

a first housing part provided with a first inner surface and a first outer surface, a second housing part provided with a second inner surface and a second outer surface, hinge means for moving the housing parts to a closed position and to an opened position, a first user interface for activating functions, the first user interface at least partly located on the inner surface of one or more housing parts, and a second user interface for activating functions, the second user interface at least partly located on the outer surface of one or more housing parts, wherein:
the control means arranged to be used in connection with the second user interface, is also arranged to be used in connection with the first user interface, and wherein a control function of said control means is arranged to be determined on the basis of the user interface set active at a time.

17. The control means according to claim 16, wherein:
the first user interface and a first control function of the control means is arranged to be activated in the opened position of the device, and wherein the second user interface and a second control function of the control means are arranged to be activated in the closed position of the device.

18. The control means according to claim 16, wherein the control means is at least partly designed button-like, spherical, cylindrical, discoidal or stick-like.

19. The control means according to claim 16, wherein the control means comprises means for generating a control signal and transmitting the same to the electronic device to control the device by means of the control means.

20. The control means according to claim 16, wherein the electronic device is a wireless communication device.

21. The control means according to claim 16, wherein said control means belongs to a control device which comprises a rotatable control means and at least one pressable control means to be used in connection with said rotatable control means.

22. A control means according to claim 21 wherein the rotatable control means and the pressable control means are from a moose device.

23. A control means according to claim 16 wherein the control means further comprises a pressable control means.

24. A control means according to claim 23 wherein the pressable control means comprises a button.

25. A control device for an electronic device, the electronic device comprising:

a first housing part provided with a first inner surface and a first outer surface, a second housing part provided with a second inner surface and a second outer surface, hinge means for moving the housing parts to a closed position and to an opened position, a first user interface at least partly located on the inner surface of one or more housing parts, a second user interface at least partly located on the outer surface of one or more housing parts, wherein:
the control device comprises a first control means located on the first user interface, and a second control means located on the second user interface, and the second control means is arranged to be used in connection with the second user interface and also arranged to be used in connection with the first user interface, and a control function of said second control means is arranged to be determined on the basis of the user interface set active at a time.

26. The control device according to claim 25, wherein the first control means is arranged to be used in connection with the second control means.

27. The control device according to claim 25, wherein the first control means comprises a rotatable control means and the second control means comprises preferably two pressable control means to be used in connection with the rotatable control means.

28. The control device according to claim 27, wherein the rotatable control means and the pressable control means define a mouse device.

* * * * *